United States Patent
Yue et al.

(10) Patent No.: US 9,998,232 B2
(45) Date of Patent: Jun. 12, 2018

(54) DETECTION AND COMPENSATION OF POWER IMBALANCES FOR A TRANSMITTER

(71) Applicant: Juniper Networks, Inc., Sunnyvale, CA (US)

(72) Inventors: Yang Yue, Milpitas, CA (US); Qiang Wang, Union City, CA (US); Bo Zhang, San Jose, CA (US)

(73) Assignee: Juniper Networks, Inc., Sunnyvale, CA (US)

(*) Notice: Subject to any disclaimer, the term of this patent is extended or adjusted under 35 U.S.C. 154(b) by 0 days. days.

(21) Appl. No.: 15/264,239

(22) Filed: Sep. 13, 2016

(65) Prior Publication Data

US 2018/0076901 A1     Mar. 15, 2018

(51) Int. Cl.
| | |
|---|---|
| *H04J 14/06* | (2006.01) |
| *H04B 10/564* | (2013.01) |
| *H04B 10/516* | (2013.01) |
| *H04B 10/50* | (2013.01) |

(52) U.S. Cl.
CPC ......... *H04B 10/564* (2013.01); *H04B 10/516* (2013.01); *H04J 14/06* (2013.01); *H04B 10/502* (2013.01); *H04B 10/503* (2013.01)

(58) Field of Classification Search
CPC ............ H04B 10/532; H04B 10/07955; H04B 10/50577; H04B 10/5561; H04J 14/06
USPC .......................................................... 398/65
See application file for complete search history.

(56) References Cited

U.S. PATENT DOCUMENTS

| | | |
|---|---|---|
| 4,553,822 A | 11/1985 | Mahlein |
| 5,491,572 A | 2/1996 | Ohara |
| 7,359,407 B1 | 4/2008 | Mattos et al. |
| 7,639,945 B2 | 12/2009 | Tamura |
| 7,733,193 B2 | 6/2010 | Kershteyn et al. |

(Continued)

FOREIGN PATENT DOCUMENTS

| | | |
|---|---|---|
| EP | 2221999 | 8/2010 |
| JP | 2002084230 | 3/2002 |

(Continued)

OTHER PUBLICATIONS

Extended European Search Report corresponding to EP 16 19 8981, dated Jun. 23, 2017, 9 pages.

(Continued)

*Primary Examiner* — Don N Vo
(74) *Attorney, Agent, or Firm* — Harrity & Harrity, LLP

(57) ABSTRACT

An optical device may include a transmitter to provide an optical signal via a set of channels and a modulator. The optical device may include two or more tributary modulators to modulate the set of channels with a training pattern. The optical device may include a set of optics to alter a first channel relative to a second channel of the set of channels. The optical device may include a detector to determine an optical power measurement of the optical signal after the first channel is altered relative to the second channel. The optical device may include a controller to generate a control signal to adjust a power balance associated with the optical signal based on the optical power measurement. The optical device may include a controller to provide the control signal to a tributary modulator to alter a modulation of the optical signal.

20 Claims, 6 Drawing Sheets

(56) References Cited

U.S. PATENT DOCUMENTS

| | | |
|---|---|---|
| 7,734,188 B2 | 6/2010 | Kuwata |
| 7,962,043 B2 | 6/2011 | Conroy |
| 7,970,285 B2 | 6/2011 | Conroy |
| 8,116,635 B2 | 2/2012 | Tanimura et al. |
| 8,428,183 B2 | 4/2013 | Khatana et al. |
| 8,565,621 B2 | 10/2013 | Ibragimov |
| 8,644,420 B2 | 2/2014 | Khatana et al. |
| 8,855,498 B2 | 10/2014 | Tanaka |
| 8,929,745 B2 | 1/2015 | Yamazaki |
| 9,020,363 B2 | 4/2015 | Yasuda |
| 9,124,364 B1* | 9/2015 | Sotoodeh ......... H04B 10/50577 |
| 9,184,834 B1 | 11/2015 | Zhang et al. |
| 9,240,843 B1 | 1/2016 | Malouin et al. |
| 9,654,226 B1* | 5/2017 | Bhandare ............... H04B 10/58 |
| 2002/0003641 A1 | 1/2002 | Hall |
| 2002/0118424 A1 | 8/2002 | Miki et al. |
| 2002/0191260 A1 | 12/2002 | Bergano |
| 2003/0184838 A1 | 10/2003 | Akiyama |
| 2004/0028418 A1 | 2/2004 | Kaplan et al. |
| 2005/0213104 A1 | 9/2005 | Fuchs et al. |
| 2006/0291867 A1 | 12/2006 | Tamura |
| 2007/0058989 A1 | 3/2007 | Kaku |
| 2008/0175586 A1 | 7/2008 | Perkins |
| 2008/0175589 A1 | 7/2008 | Perkins |
| 2008/0181620 A1 | 7/2008 | Sasaki |
| 2009/0047028 A1 | 2/2009 | Terahara |
| 2009/0086303 A1 | 4/2009 | Ide |
| 2009/0115544 A1 | 5/2009 | Kershteyn |
| 2009/0148170 A1 | 6/2009 | Perkins |
| 2009/0269080 A1 | 10/2009 | Akiyama |
| 2009/0324253 A1 | 12/2009 | Winzer |
| 2009/0324257 A1 | 12/2009 | Murakami et al. |
| 2010/0021182 A1 | 1/2010 | Asano |
| 2010/0080569 A1 | 4/2010 | Xu |
| 2010/0080570 A1 | 4/2010 | Conroy et al. |
| 2010/0119239 A1 | 5/2010 | Wang |
| 2011/0274436 A1 | 11/2011 | McNicol |
| 2011/0293276 A1 | 12/2011 | Takahara |
| 2012/0008963 A1 | 1/2012 | Aruga |
| 2012/0020660 A1 | 1/2012 | Le Taillandier De Gabory et al. |
| 2012/0039421 A1 | 2/2012 | Chrabieh et al. |
| 2012/0128357 A1 | 5/2012 | Mukai |
| 2012/0183294 A1 | 7/2012 | Boertjes et al. |
| 2012/0189319 A1 | 7/2012 | Mo et al. |
| 2012/0224847 A1 | 9/2012 | Ibragimov |
| 2012/0237202 A1 | 9/2012 | Abe et al. |
| 2012/0250792 A1 | 10/2012 | Khatana |
| 2012/0250793 A1 | 10/2012 | Khatana |
| 2012/0263456 A1 | 10/2012 | Tanaka et al. |
| 2012/0263468 A1 | 10/2012 | Yaman |
| 2012/0308240 A1 | 12/2012 | Akiyama |
| 2013/0004158 A1 | 1/2013 | Goldfarb |
| 2013/0216220 A1 | 8/2013 | Yamanaka |
| 2013/0266045 A1 | 10/2013 | Lakkis |
| 2014/0010530 A1 | 1/2014 | Goebuchi |
| 2014/0023368 A1 | 1/2014 | Bhandare |
| 2014/0133868 A1 | 5/2014 | Krause |
| 2014/0178065 A1 | 6/2014 | Mertz et al. |
| 2014/0205280 A1 | 7/2014 | Choe et al. |
| 2014/0212136 A1 | 7/2014 | Akiyama |
| 2014/0233084 A1 | 8/2014 | Ono |
| 2014/0308047 A1* | 10/2014 | Mak ................ H04B 10/5055 398/182 |
| 2015/0063825 A1 | 3/2015 | Yamase |
| 2015/0244468 A1 | 8/2015 | Mak |
| 2015/0333835 A1 | 11/2015 | Matsukawa |
| 2015/0341121 A1 | 11/2015 | Yue et al. |
| 2016/0020853 A1* | 1/2016 | Akiyama ......... H04B 10/07955 398/38 |

FOREIGN PATENT DOCUMENTS

| | | |
|---|---|---|
| WO | WO2012/133472 | 10/2012 |
| WO | WO 2014/064416 A1 | 5/2014 |

OTHER PUBLICATIONS

Yue et al., "Detection and Compensation of XY Skew for Dual-Polarization Optical Quadrature Amplitude Transmitter using Reconfigurable Interference," 2015 IEEE Photonics Conference, 28th Annual Conference of the IEEE Photonics Society, Oct. 4-8, 2015, 2 pages.

Yue et al., "IQ Skew Monitoring and Alignment of Optical Quadrature Amplitude Transmitter using Reconfigurable Interference," 2014 Conference on Lasers and Electro-Optics, Jun. 8-13, 2014, 2 pages.

Tao et al., "Simple, Robust, and Wide-Range Frequency Offset Monitor for Automatic Frequency Control in Digital Coherent Receivers," Conference on Optical Fiber communication/National Fiber Optic Engineers Conference, Feb. 24-28, 2008, 2 pages.

Kikuchi, "Chapter 2, Coherent Optical Communications: Historical Perspectives and Future Directions," High Spectral Density Optical Communication Technologies, Optical and Fiber Communications Reports 6, 2010, pp. 11-49.

Rasmussen et al., "Digital Coherent Receiver Technology for 1 00-Gb/s Optical Transport Systems" Fujitsu Sci. Tech. J., vol. 46, No. 1, Jan. 2010, pp. 63-71.

Faruk et al., "Compensation for In-Phase/Quadrature Imbalance in Coherent-Receiver Front End for Optical Quadrature Amplitude Modulation," IEEE Photonics Journal, vol. 5, No. 2, Apr. 2013, 11 pages.

European Search Report for European Application No. 16155277.3; dated Dec. 19, 2016, 11 pages.

* cited by examiner

DETECTION AND COMPENSATION OF POWER IMBALANCES FOR A TRANSMITTER

BACKGROUND

An optical transmitter is a device which includes a light emitting diode (LED) or laser source and signal conditioning electronics that is used to inject a signal into fiber. Fiber optic receivers capture the light from a fiber optic cable, decode the binary data, and convert the binary data into an electrical signal.

An optical transmitter may use a variety of modulation techniques to modulate an optical signal to carry information. Polarization multiplexing (PM) is a modulation technique where two independent electrical data signals are modulated onto an optical carrier wave having orthogonal polarizations (e.g., an X channel polarization and a Y channel polarization) so that the overall data throughput is doubled without doubling the spectral bandwidth. Quadrature amplitude modulation (QAM) is a modulation technique where two or more binary or multi-level electrical data signals are modulated, via an in-phase, or "I" channel, and a quadrature (90 degree) phase, or "Q" channel, onto a single optical carrier wave such that both the amplitude and the phase of the optical carrier wave are modulated with data to enhance the efficiency of the spectral occupancy. An optical modulator may combine two different signals, each with an I channel and a Q channel, into a single signal with an XI channel, an XQ channel, a YI channel, and an YQ channel, thereby improving spectral efficiency relative to a single signal.

SUMMARY

According to some possible implementations, an optical device may include a transmitter to provide an optical signal via a set of channels and a modulator. The optical device may include two or more tributary modulators to modulate an X polarization channel (X channel), of the set of channels, and a Y polarization channel (Y channel), of the set of channels, with a training pattern. The X channel may include an in-phase channel (XI channel), of the set of channels, and a quadrature channel (XQ channel) of the set of channels. The Y channel may include an in-phase channel (YI channel), of the set of channels, and a quadrature channel (YQ channel) of the set of channels. The optical device may include a set of optics to alter a first channel, of the set of channels, relative to a second channel of the set of channels. The optical device may include a detector to determine an optical power measurement of the optical signal after the first channel is altered relative to the second channel. The optical device may include a controller to generate a control signal to adjust a power balance associated with the optical signal based on the optical power measurement. The optical device may include a controller to provide the control signal to a tributary modulator, of the two or more tributary modulators, to alter a modulation of the optical signal.

According to some possible implementations, a device may include an optical source. The device may include a parent modulator. The parent modulator may include an X polarization channel (X channel) modulator. The parent modulator may include a Y polarization channel (Y channel) modulator. The device may include a set of optics. The device may include a detector. The device may include a control device to generate a control signal to adjust a power balance associated with an optical signal.

According to some possible implementations, an optical device may include a modulator. The modulator may receive an optical signal. The modulator may modulate the optical signal to include a first channel and a second channel. The modulator may modulate the optical signal based on a training pattern associated with detecting a power imbalance. The modulator may cause the first channel to interfere with the second channel. The modulator may perform a power measurement on the first channel and the second channel. The modulator may determine the power imbalance based on the power measurement. The modulator may reduce the power imbalance based on controlling at least one of a variable optical attenuator, a variable optical amplifier, a tunable optical coupler, or a radio frequency (RF) driver.

DETAILED DESCRIPTION

The following detailed description of example implementations refers to the accompanying drawings. The same reference numbers in different drawings may identify the same or similar elements.

Optical transmitters may modulate optical communications systems according to a modulation format. For example, optical transmitters may use dual polarization (DP) quadrature phase-shift keying (DP-QPSK), DP quadrature amplitude modulation (DP-QAM), On/Off Keying (OOK) modulation, DP-OOK modulation, Phase-shift keying (PSK) modulation, DP-PSK modulation, pulse amplitude modulation (PAM), DP-PAM, return-to-zero (RZ) modulation, DP-RZ modulation, non-return-to-zero (NRZ) modulation, DP-NRZ modulation, polarization shift (PS) modulation, DP-PS modulation, or the like. DP-QAM includes four tributary channels, XI, XQ, YI, YQ representing in-phase or quadrature (I or Q) or X polarization or Y polarization (X or Y).

A power balance may refer to a relative power between two or more channels of an optical signal, such as an X channel and a Y channel, an I channel and a Q channel, or the like. A power balance may be referred to as a power imbalance, such as when the power balance associated with a first channel and a second channel satisfies a threshold. A power imbalance (e.g., a polarization dependent power (PDP)) between a set of tributary channels may result in degraded network performance. Relatively large uncompensated IQ or XY power imbalances can significantly degrade system performance in a coherent optical communications system. For example, a 1-2 decibel (dB) IQ power imbalance may significantly deteriorate Bit Error Rate (BER) performance. Deteriorated BER performance may be particularly problematic for higher-order QAM formats. An XY power imbalance may cause a coherent optical communications system to experience performance issues after loading unpolarized noise. As an example, for an optical signal with 3-dB PDP, the weak polarization would experience an approximately 1.75-dB Optical Signal to Noise Ratio (OSNR) reduction, compared with the 0-dB PDP case. This weak polarization may limit the performance of the overall signal.

Accordingly, implementations described herein may use destructive interference to detect a power imbalance in a transmitter and correct the power imbalance in the transmitter. As a result, optical network performance may be improved relative to another technique for compensating for the power imbalance, such as compensating for the power imbalance at a receiver. For example, OSNR performance may be improved relative to compensating for the power imbalance at the receiver.

Figure 1:
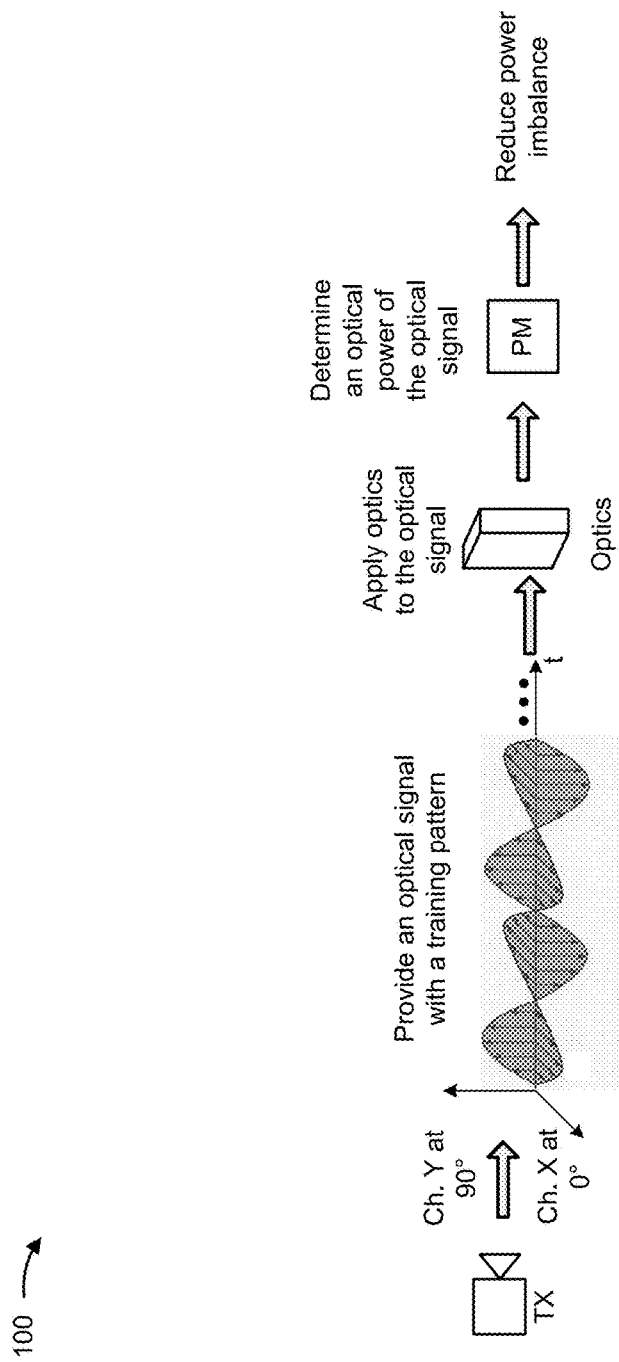
FIG. 1 is a diagram of an overview of an example implementation described herein.

FIG. 1 is a diagram of an overview of an example implementation 100 described herein. As shown in FIG. 1, a transmitter generates (e.g., using a particular modulation format, such as DP-QAM, OOK, PSK, RZ, NRZ, or the like) an optical signal with a training pattern. The training pattern may include a set of identical waveforms provided via multiple tributary channels of the transmitter. In some implementations, the transmitter applies a set of optics to the set of identical waveforms. For example, the transmitter may apply optics, such as a polarization controller and a polarizer, a polarization beam splitter, or the like. By applying the optics to adjust the phase difference between a portion of the optical signal associated with an I tributary and a portion of the optical signal associated with a Q tributary, the transmitter may cause two portions to destructively interfere using an optical coupler. Similarly, the transmitter may apply the optics to cause two orthogonal portions of the optical signal to destructively interfere using an optical polarizer whose principle axis is aligned 45 degrees to the X and Y tributary channel. Similarly, the transmitter may split the orthogonal portions of the optical signal using a polarization beam splitter (PBS).

As further shown in FIG. 1, the transmitter may measure the optical power of the optical signal after the set of optics is applied to the optical signal using a power monitor (PM), such as a photodiode, a photodetector, or the like. For example, when the transmitter causes two portions to destructively interfere, the power monitor may determine a combined power measurement. If the optical power is zero, then no power imbalance is present. In contrast, a power measurement of a non-zero value may indicate the presence of a power imbalance. Additionally, or alternatively, when the transmitter causes two portions to split using a polarization beam splitter, and the power monitor may determine a power of each portion. A common power measurement for each portion may indicate that no power imbalance is present. In contrast, a set of different power measurements for each portion may indicate the presence of a power imbalance.

As described herein, the transmitter may correct a detected power imbalance. For example, the transmitter may utilize a variable optical attenuator/amplifier (VOA) associated with a particular tributary channel to increase a power of the tributary channel or reduce the power of the tributary channel relative to one or more other tributary channels. Similarly, the transmitter may use a tunable optical coupler (TOC) to alter a ratio of an optical signal that is divided between multiple tributary channels. For example, the transmitter may redirect a greater amount of an optical signal to a tributary channel having a lower power than another tributary channel. Similarly, the transmitter may alter an output of a radio frequency (RF) driver to adjust an amount of power of a particular tributary channel. In this way, power imbalances in an optical network may be balanced in a transmitter, thereby improving network performance (e.g., by improving OSNR performance or the like) relative to the power imbalances being uncorrected or being corrected in a receiver.

As indicated above, FIG. 1 is provided merely as an example. Other examples are possible and may differ from what was described with regard to FIG. 1.

Figure 2:
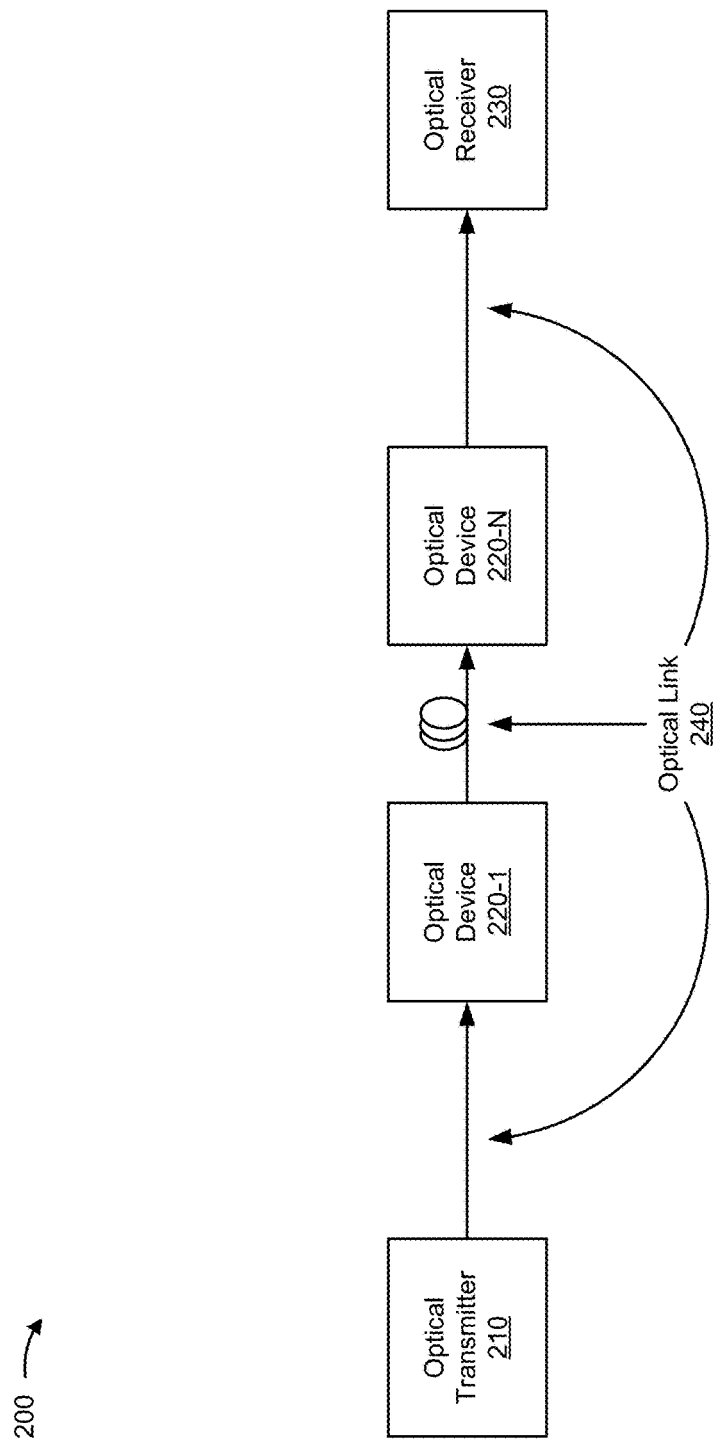
FIG. 2 is a diagram of an example environment in which systems and/or methods, described herein, may be implemented.

FIG. 2 is a diagram of an example environment 200 in which systems and/or methods described herein may be implemented. As illustrated, environment 200 may include an optical transmitter 210, one or more optical devices 220-1 through 220-N (N≥1) (hereinafter referred to individually as "optical device 220," and collectively as "optical devices 220"), an optical receiver 230, and an optical link 240.

Optical transmitter 210 may include a device capable of producing and/or transmitting an optical signal, such as an optical transmitter and/or an optical transceiver. For example, optical transmitter 210 may include a laser diode, a semiconductor laser, a continuous wave laser, and/or an optical modulator that may receive an electrical signal, and modulate, based on the electrical signal, an optical signal for transmission over optical link 240. Additionally, or alternatively, optical transmitter 210 may include a device capable of modulating an optical signal, such as an optical modulator, an electrical modulator, or the like. In some implementations, optical transmitter 210 may include a device capable of controlling properties associated with an optical signal and/or a modulator. Additionally, or alternatively, optical transmitter 210 may include an optical receiver, such as a photodetector, associated with performing a measurement on an optical signal to control properties associated with the optical signal and/or a modulator. In some implementations, optical transmitter 210 may generate an optical signal that is associated with a particular type of waveform, such as a rectangular waveform, a sinusoidal waveform, or the like.

Optical device 220 may include one or more optical traffic processing and/or optical traffic transfer devices, such as an optical node, an optical add-drop multiplexer ("OADM"), a reconfigurable optical add-drop multiplexer ("ROADM"), an optical multiplexer, an optical demultiplexer, an optical transmitter, an optical receiver, an optical transceiver, a photonic integrated circuit, an integrated optical circuit, a wavelength selective switch, a free space optics device, a computer, a server, a router, a bridge, a gateway, a modem, a firewall, a switch, a network interface card, a hub, and/or another type of device capable of processing and/or transferring optical traffic. Optical device 220 may process an optical signal and/or transmit an optical signal to another optical device 220 (and/or to optical receiver 230) via optical link 240.

Optical receiver 230 may include a device capable of receiving an optical signal, such as an optical receiver and/or an optical transceiver. For example, optical receiver 230 may include a photodetector and/or a photodiode that may detect an optical signal received via optical link 240, and may convert the optical signal into an electrical signal. Additionally, or alternatively, optical receiver 230 may include a device capable of de-modulating an optical signal. In some implementations, optical receiver 230 may include a device capable of controlling properties associated with an optical signal and/or a de-modulator.

Optical link 240 may include a medium capable of carrying optical signals. For example, optical link 240 may include an optical fiber that interconnects optical transmitter 210, optical devices 220, and optical receiver 230.

The number and arrangement of devices shown in FIG. 2 are provided as an example. In practice, there may be additional devices, fewer devices, different devices, or differently arranged devices than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3A:
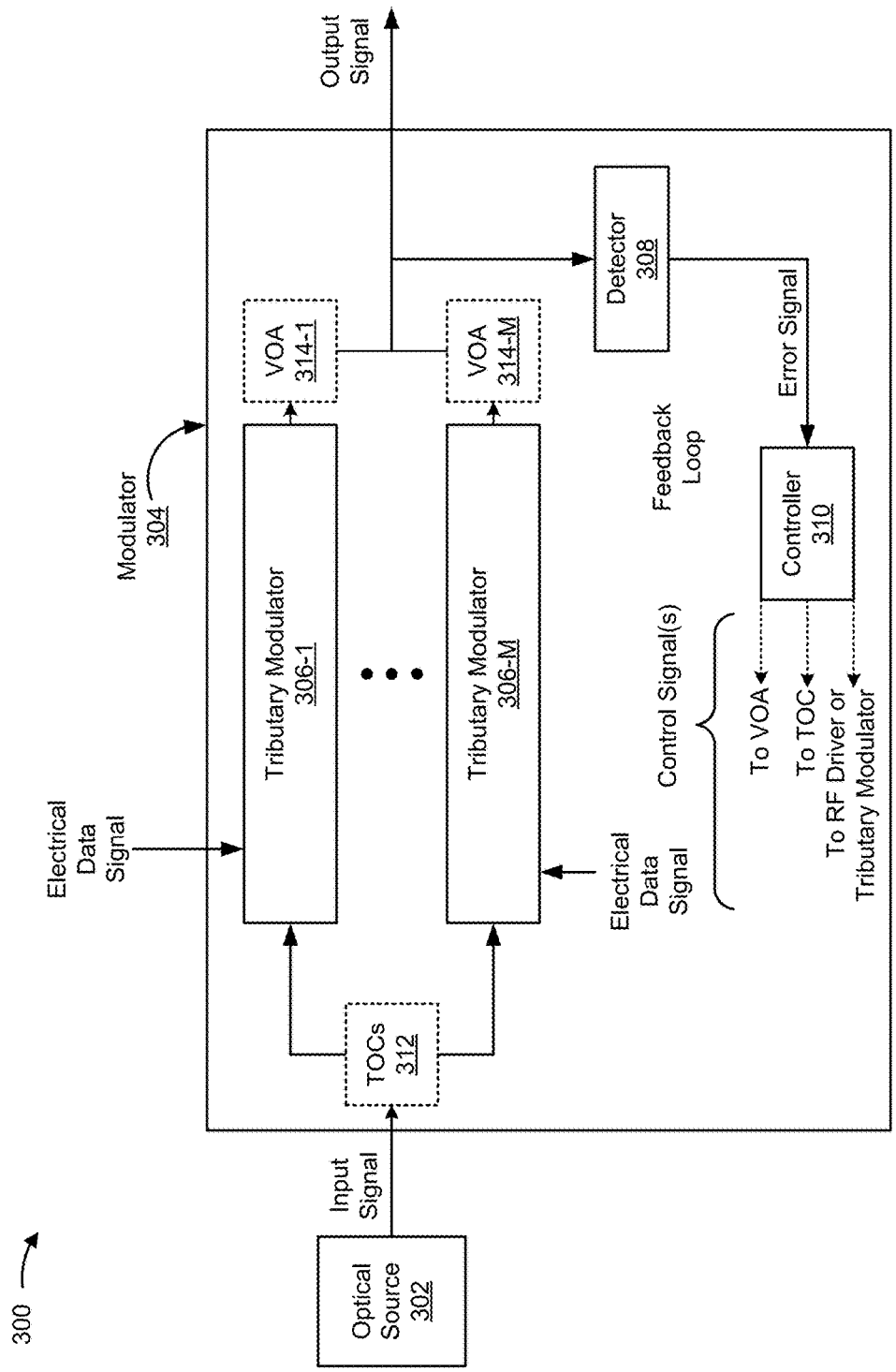
FIGS. 3A-3C are diagrams of example components of one or more devices of FIG. 2.
Figure 3B:
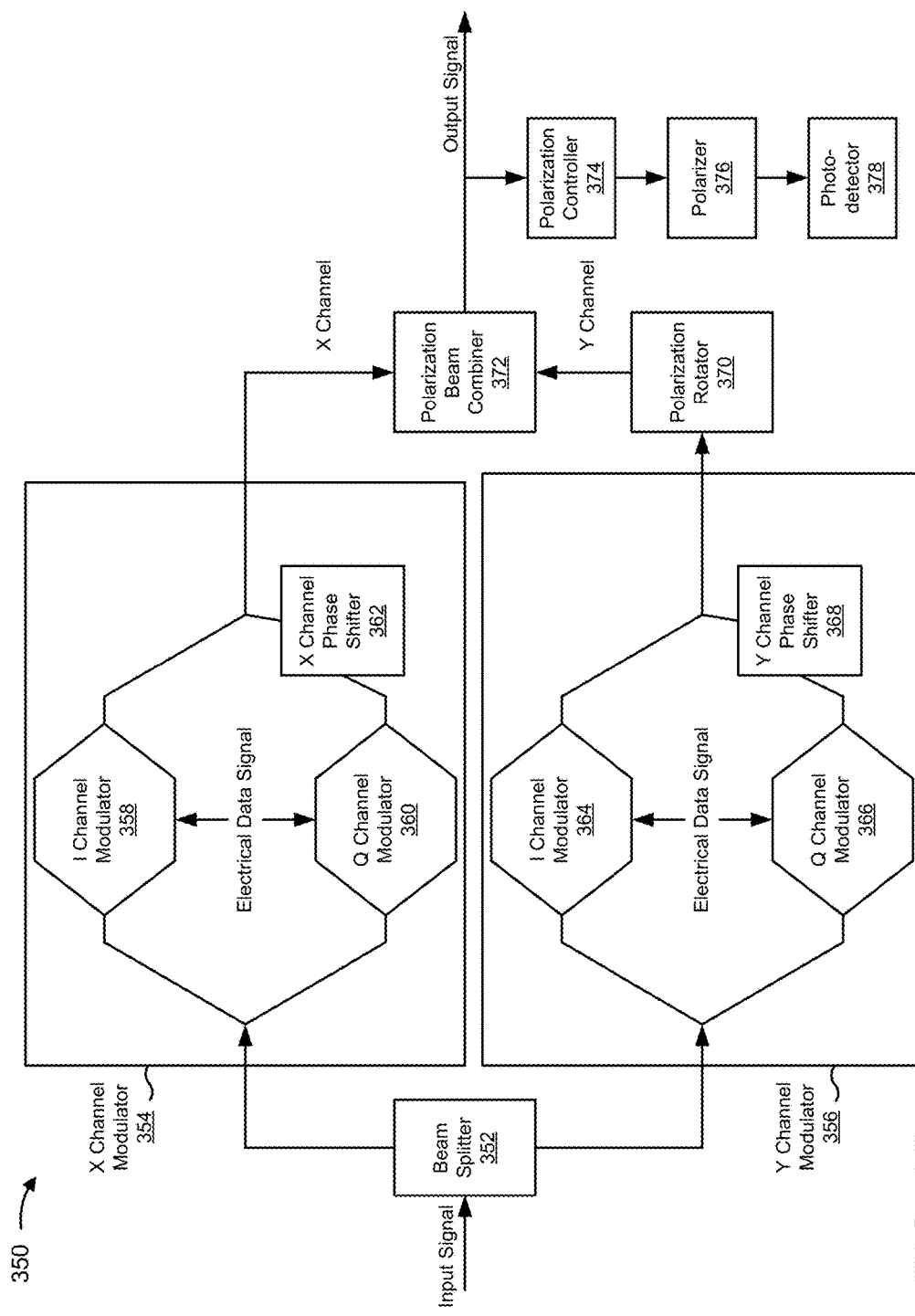
Figure 3C:
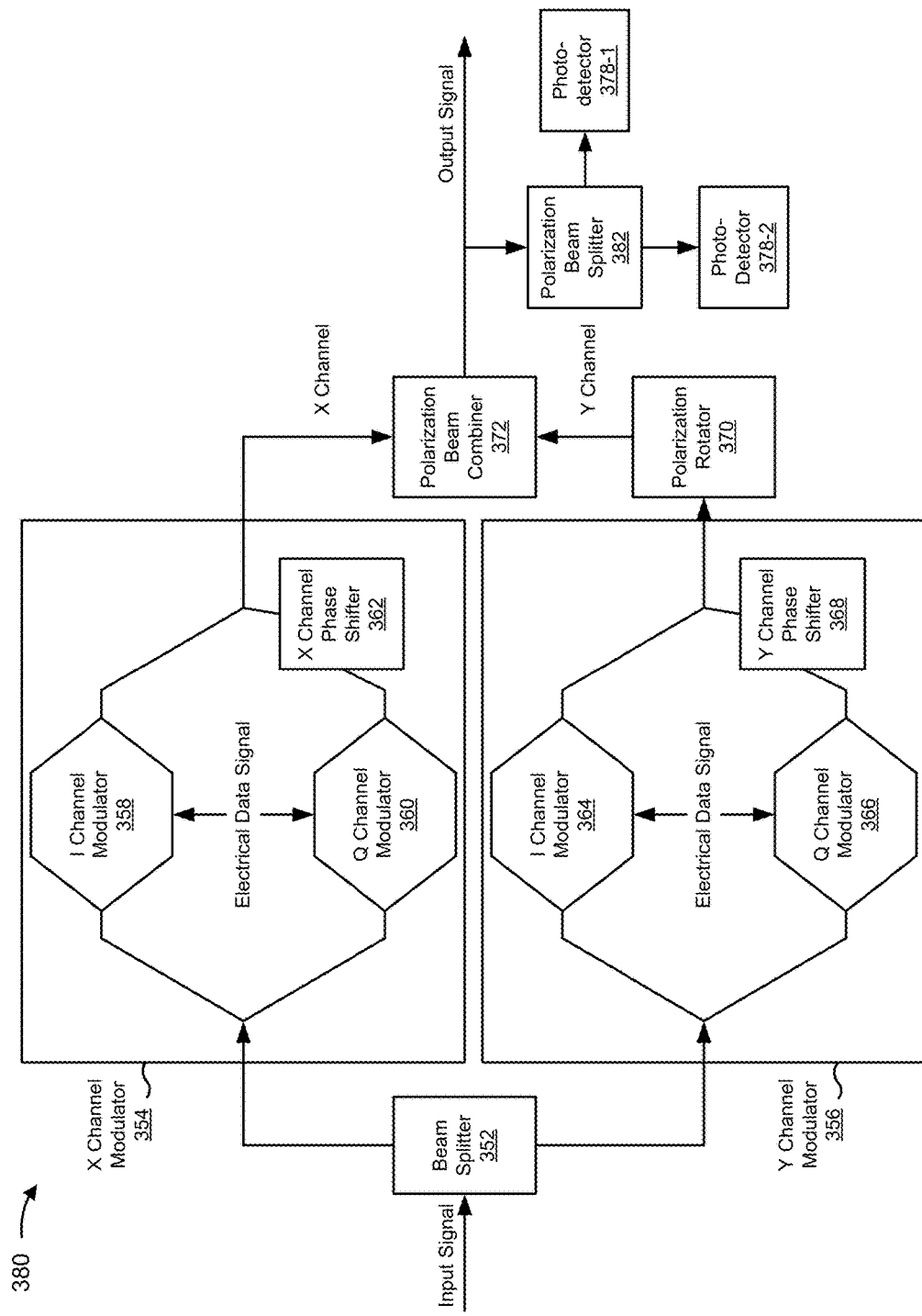

FIGS. 3A-3C are diagrams of example devices relating to optical transmitter 210. FIG. 3A shows an example of a device 300, which may correspond to optical transmitter 210. Device 300 may include an optical source 302 and a modulator 304. Modulator 304 may include a set of tributary modulators 306-1 through 306-M (M≥1) (hereinafter referred to individually as "tributary modulator 306," and collectively as "tributary modulators 306"), a detector 308, and a controller 310. In some implementations, modulator 304 may include a tunable optical controller (TOC) 312, a set of variable optical attenuators/amplifiers (VOAs) 314-1 through 314-M (M≥1) (hereinafter referred to individually as "VOA 314," and collectively as "VOAs 314"), or the like.

Optical source 302 may include a device capable of producing and/or transmitting an optical signal. For example, optical source 302 may include a laser diode, a semiconductor laser, and/or a continuous wave laser.

Modulator 304 may include a device capable of modulating an optical signal. For example, modulator 304 may produce a modulating signal, which may vary one or more properties (e.g., amplitude/intensity, phase, frequency/wavelength, polarization, etc.) of a carrier signal (e.g., a carrier wave) produced by optical source 302. In some implementations, modulator 304 may include a polarizer, a polarization controller, a polarization splitter, a polarization combiner, and/or a polarization rotator. Additionally, or alternatively, modulator 304 may include an indium phosphide semiconductor-based modulator. Additionally, or alternatively, modulator 304 may include a Mach-Zehnder ("MZ") modulator, an electro-absorption modulator, a phase modulator, an intensity modulator (e.g., an OOK modulator), a return to zero (RZ) modulator, a non-return to zero (NRZ) modulator, a PSK modulator, a binary PSK (BPSK) modulator, a Quad PSK (QPSK) modulator, a QAM modulator, an M-ary QAM (M-QAM) modulator, any polarization multiplexed (PM) versions of the above listed modulators (e.g., a DPBPSK modulator, a DPQAM modulator, or the like), and/or any other modulator or combination of modulators.

In some implementations, modulator 304 may cause an optical signal to be split into a set of channels (e.g., a first channel and a second channel). For example, modulator 305 may cause the optical signal to be split into an X channel and a Y channel, an I channel and a Q channel, an XI channel and a XQ channel, a YI channel and a YQ channel, or the like. In some implementations, modulator 304 may cause the optical signal to be split into a set of portions, such as a set of orthogonal portions, a set of non-orthogonal portions, or the like.

Tributary modulator 306 may include a device and/or circuitry capable of modulating an optical signal. For example, tributary modulator 306 may receive an input signal from optical source 302, and may modulate the input signal with an electrical data signal. Additionally, or alternatively, tributary modulator 306 may receive a control signal via a feedback loop, and may adjust the operating condition of the modulator using the control signal, for example the bias point or the peak-to-peak swing of driving voltage for particular tributary modulator. Tributary modulator 306 may tap off the modulated signal to a monitor photodetector of detector 308.

Modulator 304 may include multiple tributary modulators 306, and the signals generated by each tributary modulator 306 may be combined by modulator 304 to produce an output signal. For example, modulator 304 may include a QAM modulator with two tributary modulators 306, one to modulate signals on the I channel, and one to modulate signals on the Q channel. Modulator 304 may combine the signals on the I and Q channels to generate the output signal. Additionally, or alternatively, modulator 304 may include a PM modulator with two tributary modulators 306, one to modulate signals at the X polarization, and one to modulate signals at the Y polarization. Modulator 304 may combine the signals at the X and Y polarizations to generate the output signal. Additionally, or alternatively, modulator 304 may include a DPQAM modulator with four tributary modulators 306, one to modulate signals at the XI channel, one to modulate signals at the XQ channel, one to modulate signals at the YI channel, and one to modulate signals at the YQ channel. Modulator 304 may be referred to as a "parent modulator" that combines signals from two or more tributary modulators 306.

In some implementations, multiple modulators 304 may be nested so that the output signal of a particular modulator 304 is included in the output signal for another modulator 304. For example, a combined output signal from a first I modulator and a first Q modulator may produce the output signal of an X modulator and an output signal from a second I modulator and a second Q modulator may produce the output signal of a Y modulator, and the outputs from the X modulator and the Y modulator may be combined into an output signal of a PM modulator to be transmitted over an optical network, as described in more detail below in connection with FIGS. 3B and 3C.

Detector 308 may include a device and/or circuitry capable of detecting a form of error in a modulated optical signal. For example, detector 308 may detect an optical power of the optical signal, after a first portion of the optical signal and a second portion of the optical signal are modulated by tributary modulators 306 to cause interference between the first portion of the optical signal and the second portion of the optical signal. Additionally, or alternatively, detector 308 may detect a difference in a first optical power of a first channel (e.g., with a first polarization) and a second optical power of a second channel (e.g., with a second polarization). In some implementations, device 300 may include an interference device, such as one or more phase shifters, polarization rotators, polarization beam combiners, polarization controllers, or polarizers, associated with causing the first portion of the optical signal to interfere with the second portion of the optical signal.

Detector 308 may pass an error signal, based on the detected error, to a controller 310. For example, detector 308 may provide the error signal to indicate the optical power of the optical signal or of a portion of the optical signal at one or more time-samples. In some implementations, detector 308 may include a low-speed (e.g., a less than approximately 100 Megabits per second (Mbits/s) detector). Additionally, or alternatively, detector 308 may include a high-speed detector (e.g., a greater than approximately 100 Mbits/s detector).

Controller 310 may include a device and/or circuitry capable of controlling properties of an optical signal. For example, controller 310 may include a control device that controls properties of tributary modulator 306, TOC 312, VOA 314, a radio frequency (RF) driver (e.g., which provides the electrical data signal), or the like. In some implementations, controller 310 may determine a power imbalance associated with an optical signal based on a set of optical power measurements performed by detector 308, and may generate a control signal to adjust tributary modulators 306, TOC 312, VOA 214, an RF driver (e.g., an electrical output swing of the RF driver), or the like to compensate for the power imbalance. In some implementations, controller 310 may control the properties using a feedback loop. For example, controller 310 may receive a first error signal from detector 308, may generate a first control signal based on the first error signal, and may provide the first control signal to control the properties of the optical signal at a first time interval, and may receive a second error signal at a second time interval and after controlling the properties of optical signal, generate a second control signal based on the second error signal, and provide the second control signal to further control the optical signal. In some implementations, controller 310 may include a training pattern generator that may be utilized to select and/or generate a training pattern that is applied to the optical signal. For example, controller 310 may cause multiple portions of the optical signal associated with multiple channels to be modulated to carry the same training pattern. In this case, the multiple portions of the optical signal may be combined by applying the set of optics, and the multiple portions of the optical signal may destructively interfere based on being modulated to carry the same training pattern. In some implementations, controller 310 may cause a training pattern to be applied to an optical signal to reduce a skew of the optical signal, a bias of the optical signal, or the like.

TOC 312 may include a device and/or circuitry capable of controlling a coupling ratio of an optical signal. For example, TOC 312 may receive an optical signal and may cause a first portion of the optical signal to be provided to a first tributary modulator 306 and a second portion of the optical signal to be provided to a second tributary modulator 306 with a particular ratio of the first portion to the second portion. In some implementations, TOC 312 may adjust the coupling ratio based on a control signal. For example, based on receiving a control signal from controller 310, TOC 312 may adjust the coupling ratio to increase the first portion relative to the second portion, decrease the first portion relative to the second portion, or the like, thereby reducing a power imbalance of portions of the optical signal. In some implementations, TOC 312 may be included in a beam splitter or another device and/or circuitry capable of splitting the optical signal or a portion thereof.

VOA 314 may include a device and/or circuitry capable of controlling an optical power of an optical signal. For example, VOA 314 may receive an optical signal and may amplify or attenuate the optical signal to alter the optical power of the optical signal. In some implementations, VOA 314 may alter the optical power of the optical signal based on a control signal. For example, based on receiving a control signal from controller 310, VOA 314 may alter a level of amplification or attenuation of the optical signal or a portion thereof to reduce a power imbalance between portions of the optical signal.

Device 300 may be implemented using free-space optics, fiber optics, integrated optics (e.g., Si, Silicon Nitride, Silica, III-V, etc. optics), or the like.

FIG. 3B is a diagram of another example device 350 in which systems and/or methods described herein may be implemented. For example, device 350 may correspond to modulator 304 of device 300, a portion of modulator 304 of device 300, or the like. Device 350 may include a beam splitter 352, an X channel modulator 354, a Y channel modulator 356, a polarization rotator 370, a polarization beam combiner 372, a polarization controller 374, a polarizer 376, and a photodetector 378. X channel modulator 354 may include an I channel modulator 358, a Q channel modulator 360, and an X channel phase shifter 362. Y channel modulator 356 may include an I channel modulator 364, a Q channel modulator 366, and a Y channel phase shifter 368.

In some implementations, device 350 may correspond to modulator 304, and X channel modulator 354 and Y channel modulator 356 may correspond to tributary modulators 306. Additionally, or alternatively, X channel modulator 354 may correspond to modulator 304, and I channel modulator 358 and Q channel modulator 360 may correspond to tributary modulators 306. Additionally, or alternatively, Y channel modulator 356 may correspond to modulator 304, and I channel modulator 364 and Q channel modulator 366 may correspond to tributary modulators 306.

Device 350 may receive an input optical signal (e.g., a lightbeam), which may be received by beam splitter 352. Beam splitter 352 may split the input optical signal into (at least) two paths. X channel modulator 354 and Y channel modulator 356 may each receive an optical signal on a respective one of the paths, and may modulate each optical signal using an electrical driving signal using modulators 358, 360, 364, and 366 to each produce an output optical signal.

The output optical signal from at least one of the tributary channels (e.g., from Q channel modulator 360, from Q channel modulator 366, or the like) may be phase shifted to a particular phase with respect to another tributary channel by a phase shifter, such as X channel phase shifter 362, Y channel phase shifter 368, or the like. For example, an output optical signal of Q channel modulator 360 may be phase shifted by X channel phase shifter 362 with respect to another output optical signal of I channel modulator 358. In some implementations, the phase shift between the I channel portion and the Q channel portion is 90 degree so that the I portion of the optical signal is orthogonal (or approximately orthogonal) with the Q portion of the optical signal In some implementations, X channel phase shifter 362 and/or Y channel phase shifter 368 may apply a particular phase shift (e.g., a 0 degree phase shift, a 180 degree phase shift, or the like) to one of an XI channel or an XQ channel and/or one of a YI channel or a YQ channel, respectively. In this case, applying the particular phase shift may cause constructive or destructive interference between the I portion and the Q portion. In some implementations, interference may be caused during an initial configuration, during a reconfiguration, or the like.

The output optical signal from at least one of the paths (e.g., from Y channel modulator 356) may be rotated to a particular polarization by polarization rotator 370. In some implementations, polarization rotator 370 may rotate the output optical signal from at least one of the paths such that the output signal from X channel modulator 354 and the output signal from Y channel modulator 356 are orthogonal (or approximately orthogonal).

Polarization controller 374 and polarizer 376 may cause a first portion of the output optical signal from polarization beam combiner 372 to interfere with a second portion of the output optical signal from polarization beam combiner 372. For example, polarization controller 374 and polarizer 376 may cause an X portion to interfere with a Y portion. Alternatively, the phase shifter 362 or 368 may cause an I portion to interfere with a Q portion within the same polarization. Photodetector 378, which may correspond to detector 308, may perform a power measurement of the output optical signal after polarization controller 374 and polarizer 376 cause the interference.

FIG. 3C is a diagram of another example device 380 in which systems and/or methods described herein may be implemented. For example, device 380 may correspond to modulator 304 of device 300 or a portion of modulator 304. Device 380 may include beam splitter 352, X channel modulator 354, Y channel modulator 356, polarization rotator 370, polarization beam combiner 372, photodetectors 378-1 and 378-2, and polarization beam splitter 382. Device 380 is configured similar to device 350; however, device 380 may utilize polarization beam splitter 382 to split a portion of an output of polarization beam combiner 372 into a first portion of the portion and a second portion of the portion. Photodetectors 378-1 and 378-2, which may correspond to detector 308, may receive outputs of polarization beam splitter 382 and perform a set of power measurements on the first portion and the second portion.

The number and arrangement of devices and components shown in FIGS. 3A-3C are provided as an example. In practice, there may be additional devices or components, fewer devices or components, different devices or components, or differently arranged devices or components than those shown in FIGS. 3A-3C. Furthermore, two or more devices or components shown in FIGS. 3A-3C may be implemented within a single device or component, or a single device or component shown in FIG. 3A-3C may be implemented as multiple, distributed devices or components. Additionally, or alternatively, a set of devices (e.g., one or more devices) or components of FIGS. 3A-3C may perform one or more functions described as being performed by another set of devices or components of FIGS. 3A-3C.

Components of FIGS. 3A-3C may include electrical circuits, optical circuits, or a combination of electrical circuits and optical circuits.

Figure 4:
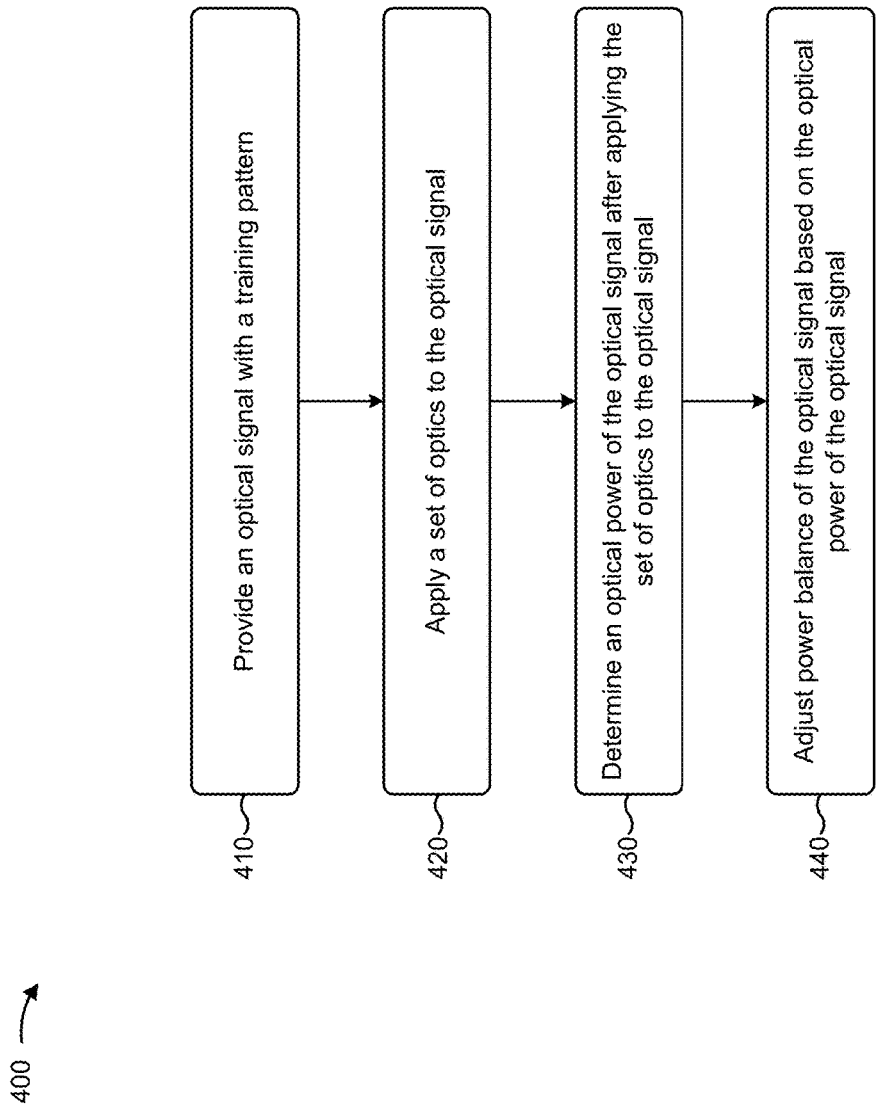
FIG. 4 is a flow chart of an example process for reducing a power imbalance for a transmitter.

FIG. 4 is a flow chart of an example process 400 for reducing a power imbalance for a transmitter. In some implementations, one or more process blocks of FIG. 4 may be performed by optical transmitter 210. In some implementations, one or more process blocks of FIG. 4 may be performed by another device or a group of devices separate from or including optical transmitter 210, such as optical device 220 and/or optical link 240.

As shown in FIG. 4, process 400 may include providing an optical signal with a training pattern (block 410). For example, optical transmitter 210 may provide an optical signal with a training pattern. In some implementations, optical transmitter 210 may provide a training pattern that is the same for each tributary channel, such as a sinusoidal pattern, a stepwise pattern, a pseudo random binary sequence (PRBS) pattern, a fixed pattern, an inverted pattern, a rectangular pattern, or the like. In some implementations, optical transmitter 210 may provide the training pattern at an initial configuration (e.g., at a setup and calibration phase). In some implementations, optical transmitter 210 may provide the training pattern after a threshold amount of time has elapsed from a previous calibration. Additionally, or alternatively, optical transmitter 210 may provide the training pattern based on determining that network performance fails to satisfy a threshold level of performance (e.g., when an OSNR fails to satisfy an OSNR threshold). Additionally, or alternatively, optical transmitter 210 may provide the training pattern when the optical transmitter is reconfigured to a different wavelength.

In some implementations, optical transmitter 210 may provide the optical signal with the training pattern after calibrating the transmitter to reduce a skew value or a quadrature bias value. For example, optical transmitter 210 may calibrate the transmitter to reduce the skew between different tributary channels of the transmitter or a bias between different tributary channels. In this case, optical transmitter 210 may perform a skew alignment or quadrature bias reduction procedure before performing a power balancing procedure, thereby improving an accuracy of the power balancing procedure relative to the skew or quadrature bias preventing an accurate determination of an IQ power imbalance or XY power imbalance by altering a result of destructive interference. In some implementations, optical transmitter 210 may provide the optical signal with the training pattern or another training pattern for calibrating for a skew (e.g., an IQ or an XY skew). Then optical transmitter 210 may provide the optical signal with the training pattern for calibration for a power imbalance.

In some implementations, the transmitter may reduce a skew or bias associated with the optical signal before controlling a power balance of the optical signal. For example, the transmitter may control an IQ skew of an X polarization, control an IQ power balance of an X polarization, control an IQ skew of a Y polarization, control an IQ power balance of a Y polarization, control an XY skew, and control an XY power balance, sequentially.

As further shown in FIG. 4, process 400 may include applying a set of optics to the optical signal (block 420). For example, optical transmitter 210 may cause a set of optics to be applied to the optical signal to adjust a polarization of the optical signal (e.g., to cause a first portion of the optical signal to interfere with a second portion, to cause the first portion to be combined with the second portion, or to cause the first portion to be split from the second portion). Additionally, or alternatively, optical transmitter 210 may apply the set of optics to adjust a phase value using a phase shifter to cause an I portion to be combined with a Q portion within the same polarization.

In some implementations, the set of optics (e.g., an interference device or the phase shifter) may be used to cause two portions of an optical signal to destructively interfere by using an optical coupler to cause a first tributary channel associated with a first modulator to interfere with a second tributary channel associated with a second modulator. For example, a phase shifter may cause an I tributary channel to destructively interfere with a Q tributary channel to determine an IQ power imbalance. In some implementations, the set of optics may be used to identify an XY power imbalance by using an optical polarizer (e.g., aligned 45 degrees) to an X polarization tributary channel and 45 degrees to a Y polarization tributary channel to cause a first optical signal of the X channel to interfere with a second optical signal of a Y channel. In some implementations, the set of optics may be used to identify an XY power imbalance (e.g., a polarization alignment imperfection exists) by using a polarization beam splitter to split the combined optical signal (e.g., after modulation via multiple tributary channels) into a first portion and a second portion. Even with non-perfect polarization alignment between optical signal and PBS, the power measurement on a first portion and a second portion can still determine the XY power imbalance. If the power from a first portion is equivalent to the power a second portion, or if the difference between power from a first portion and power from a second portion is smaller than certain threshold, the XY power imbalance is compensated.

In some implementations, optical transmitter 210 may sequentially identify imbalances (e.g. identify IQ power imbalance followed by XY power imbalance, or vice versa), and may correct the imbalances sequentially. In some implementations, optical transmitter 210 may identify imbalances concurrently (e.g., concurrently identify both IQ power imbalance and XY power imbalance), and may correct the imbalances concurrently.

As further shown in FIG. 4, process 400 may include determining an optical power of the optical signal after applying the set of optics to the optical signal (block 430). For example, optical transmitter 210 may determine an optical power of the optical signal after causing the set of optics to be applied to the optical signal. In some implementations, optical transmitter 210 may use a power monitor (e.g., a photodetector) to determine an optical power of the optical signal. For example, optical transmitter 210 may determine a combined optical power after causing the optical signal to destructively interfere. Additionally, or alternatively, optical transmitter 210 may determine a set of optical powers for a set of portions of the optical signal after splitting the optical signal in two orthogonal polarizations.

In some implementations, optical transmitter 210 may determine whether a power imbalance is present (e.g., based on determining the optical power). For example, a combined optical power of non-zero or greater than zero by a threshold amount may indicate that a power imbalance is present and a combined optical power of zero or within a threshold amount of zero indicates that no power imbalance is present. Similarly, different optical powers in a set of optical powers or different optical powers by a threshold amount may indicate the presence of a power imbalance and the same optical powers or within a threshold amount of the same optical powers in a set of optical powers may indicate that no imbalance is present.

As further shown in FIG. 4, process 400 may include adjusting the power balance of the optical signal based on the optical power of the optical signal (block 440). For example, the optical transmitter 210 may adjust the power balance of the optical signal based on the optical power of the optical signal. In some implementations, the optical transmitter 210 may use a variable optical attenuator/amplifier (VOA) associated with a tributary channel to attenuate (decrease) or amplify (increase) an optical power of a tributary channel. In some implementations, each tributary channel may include a VOA. Alternatively, each pair of tributary channels may include a single VOA, thereby reducing the quantity of VOAs and the cost of optical transmitter 210 relative to the optical transmitter using a VOA for each tributary channel. For example, the XI channel may include a VOA whereas the YI does not (or vice versa). Similarly, the XQ channel may include a VOA whereas the YQ channel does not (or vice versa).

In some implementations, optical transmitter 210 may use a TOC associated with each input split to a set of tributary channels (e.g., an X Y split, an XI XQ split, or a YI YQ split) to alter a ratio of the optical signal provided to each tributary channel after split. In some implementations, optical transmitter 210 may provide a control signal to a radio frequency (RF) driver to cause an alteration to an electrical output of the RF driver provided to a tributary modulator to alter a power of a tributary channel after modulation by the tributary modulator. In some implementations, optical transmitter 210 may perform multiple adjustments (e.g., adjust power, check new power imbalance, re-adjust, re-check, and so on).

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

As described herein, an optical transmitter may be used to correct a detected power imbalance. For example, the optical transmitter may provide a control signal to a VOA (variable optical amplifier/attenuator), TOC, or an RF driver to increase or decrease a power of the tributary channel. In this way, the optical transmitter corrects power imbalances in an optical network, thereby improving network performance (e.g., by improving OSNR performance or the like) relative to the power imbalance remaining uncorrected or the power balance being corrected by an optical receiver.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. An optical device, comprising:
   a transmitter to provide an optical signal via a set of channels; and
   a modulator comprising:
      two or more tributary modulators to modulate an X polarization channel (X channel), of the set of channels, and a Y polarization channel (Y channel), of the set of channels, with a training pattern,
         the X channel including an in-phase channel (XI channel), of the set of channels, and a quadrature channel (XQ channel) of the set of channels,
         the Y channel including an in-phase channel (YI channel), of the set of channels, and a quadrature channel (YQ channel) of the set of channels;
      a set of optics to alter a first channel, of the set of channels, relative to a second channel of the set of channels to cause the first channel to destructively interfere with the second channel;
      a detector to determine an optical power measurement of the optical signal after the first channel is caused to interfere with the second channel; and
      a controller to:
         generate a control signal to adjust a power balance associated with the optical signal based on the optical power measurement; and
         provide the control signal to a tributary modulator, of the two or more tributary modulators, to alter a modulation of the optical signal.

2. The optical device of claim 1, where the modulator further comprises:
   a variable optical attenuator to receive the control signal and attenuate at least one of the first channel or the second channel to adjust the power balance.

3. The optical device of claim 1, where the modulator further comprises:
   a variable optical amplifier to receive the control signal and amplify at least one of the first channel or the second channel to adjust the power balance.

4. The optical device of claim 1, where the modulator further comprises:
   a tunable optical coupler to receive the control signal and adjust a coupling ratio associated with at least one of the first channel or the second channel to adjust the power balance.

5. The optical device of claim 1, where the control signal is a radio frequency (RF) driver control signal to adjust an RF driver.

6. The optical device of claim 1, where the modulator is to modulate one or more portions of the optical signal with a training pattern.

7. The optical device of claim 6, where the power balance is an in-phase/quadrature (IQ) power; and
   where the set of optics includes an optical phase shifter to cause the first channel to destructively interfere with the second channel.

8. The optical device of claim 6, where the power balance is an XY power balance; and
   where the set of optics includes an optical polarizer to cause the first channel to destructively interfere with the second channel,
      the first channel being orthogonal to the second channel,
      the optical polarizer being aligned 45 degrees to the first channel and to the second channel.

9. The optical device of claim 1, where the power balance is an XY power balance; and
   where the set of optics includes a polarization beam splitter to beam split the optical signal into a first portion and a second portion; and
   where the detector is to:
      determine the optical power measurement of the first portion and of the second portion.

10. The optical device of claim 1, where the controller is further to:
    determine a skew imperfection or bias imperfection associated with the set of channels;
    generate another control signal to adjust a skew value or bias value; and
    provide the other control signal to the modulator to alter the skew imperfection or the bias imperfection.

11. A device, comprising:
    an optical source to produce an optical signal; and
    a parent modulator comprising:
       an X channel (X channel) modulator;
       a Y channel (Y channel) modulator,
          the X channel modulator and the Y channel modulator to modulate the optical signal based on a training pattern associated with detecting a power imbalance;
       a set of optics,
          the set of optics causing a first portion of the optical signal to destructively interfere with a second portion of the optical signal;
       a detector,
          the detector performing a power measurement on the optical signal after the first portion is caused to interfere with the second portion; and
       a control device to:
          receive information regarding an optical power of the optical signal from the detector after the first portion of the optical signal is caused to destructively interfere with the second portion of the optical signal by the set of optics,
          determine at least one of XY power imbalance or an IQ power imbalance of the optical signal based on the information regarding the optical power, and
          generate a control signal to reduce the at least one of the XY power imbalance or the IQ power imbalance.

12. The device of claim 11, where the X channel modulator further comprises:
    an in-phase channel (I channel) modulator; and
    a quadrature channel (Q channel) modulator.

13. The device of claim 11, where the Y channel modulator further comprises:
    an in-phase channel (I channel) modulator; and
    a quadrature channel (Q channel) modulator.

14. The device of claim 11, where the set of optics comprises at least one of:
    a phase shifter,
    a polarization rotator,
    a polarization beam combiner,
    a polarization beam splitter,
    a polarizer, or
    a polarization controller.

15. The device of claim 11, where the control device is to:
    provide the control signal to at least one of:
       the X channel modulator, or
       the Y channel modulator.

16. The device of claim 11, where the control device is to:
    determine that a power balance of the optical signal satisfies a threshold; and facilitate transmission of information based on determining that the power balance of the optical signal satisfies the threshold.

17. An optical device, comprising:
a modulator to:
  receive an optical signal;
  modulate the optical signal to include a first channel and a second channel;
  modulate the optical signal based on a training pattern associated with detecting a power imbalance;
  cause the first channel to interfere with the second channel;
  perform a power measurement on the first channel and the second channel;
  determine the power imbalance based on the power measurement; and
  reduce the power imbalance based on controlling at least one of:
    a variable optical attenuator,
    a variable optical amplifier,
    a tunable optical coupler, or
    a radio frequency (RF) driver.

18. The optical device of claim 17, where the first channel is a first polarization channel, the second channel is a second polarization channel, and the power imbalance is an XY power imbalance or an in-phase/quadrature (IQ) power imbalance; and
  where the modulator is further to:
    configure a set of optics, such that the first channel and the second channel interfere when combined; and
  where the modulator, when causing the first channel to interfere with the second channel, is to:
    combine the first channel and the second channel.

19. The optical device of claim 18, where the set of optics includes a polarization beam splitter to beam split the optical signal into the first channel and the second channel.

20. The optical device of claim 17, where the optical signal is modulated based on at least one of:
  a dual-polarization (DP) quadrature amplitude modulation (QAM) format,
  a DP phase shift keying format,
  a DP binary phase shift keying format,
  a DP pulse-amplitude format,
  a DP on-off keying format,
  a DP pulse-position format,
  a DP return-to-zero format,
  a DP non-return-to-zero format, or
  a polarization shift keying format.

* * * * *